United States Patent [19]
Brauning et al.

[11] 3,873,987
[45] Mar. 25, 1975

[54] DIAPHRAGM SHUTTER

[75] Inventors: Gerhard Brauning, Stuttgart; Wolfgang Ort, Stuttgart-Bad Cannstatt, both of Germany

[73] Assignee: Eastman Kodak Company, Rochester, N.Y.

[22] Filed: Sept. 13, 1973

[21] Appl. No.: 397,187

[30] Foreign Application Priority Data
Sept. 23, 1972 Germany.................... 7235116

[52] U.S. Cl............... 354/26, 354/230, 354/256, 354/259
[51] Int. Cl............................................. G03b 7/08
[58] Field of Search.......... 354/259, 256, 230, 243, 354/244, 26, 29, 30

[56] References Cited
UNITED STATES PATENTS

| | | | |
|---|---|---|---|
| 1,435,999 | 11/1922 | Wollensak et al. | 354/256 |
| 2,890,640 | 6/1959 | Noack | 354/259 |
| 3,099,197 | 7/1963 | Kiper | 354/259 |
| 3,251,288 | 5/1966 | Kitai | 354/259 |
| 3,430,547 | 3/1969 | Norton | 354/259 |
| 3,722,392 | 3/1973 | Kitai | 354/259 |

Primary Examiner—Samuel S. Matthews
Assistant Examiner—Russell E. Adams, Jr.
Attorney, Agent, or Firm—J. L. Palmer

[57] ABSTRACT

A diaphragm shutter includes apertured diaphragm shutter blades mounted for movement from a minimum aperture position to a maximum aperture position through a sequence of delays provided by an inertial delay member located to be engaged by the diaphragm blades as the diaphragm shutter blades move from the minimum aperture position toward the maximum aperture position. The inertial delay member includes an escapement mechanism, engageable by one of the diaphragm shutter blades, which is selectively contoured at a position of engagement by the diaphragm shutter blade to provide for the sequence of delays in the opening of the diaphragm shutter movement. The diaphragm shutter blades are permitted to move unimpeded to a preselected aperture size before engagement with the escapement mechanism. Light responsive means operate to move the blades to form the minimum aperture size after an exposure aperture has been formed which permits proper exposure in relation to received light intensity.

4 Claims, 5 Drawing Figures

PATENTED MAR 25 1975

PATENTED MAR 25 1975 3,873,987

DIAPHRAGM SHUTTER

BACKGROUND OF THE INVENTION

1. Field of the Invention

This invention relates to diaphragm shutters and more particularly to a diaphragm shutter controlled in response to received illumination and including an inertial delay escapement mechanism for establishing an exposure program of aperture size and time in relation to received illumination.

2. Description of the Prior Art

Diaphragm shutters are known which use an escapement mechanism for establishing an exposure program under which the apparatus operates to provide an exposure related to received light intensity. These devices begin to operate on the diaphragm shutter immediately upon release and retard of the opening movement of the diaphragm shutter. Some of such prior art escapement mechanisms permit the diaphragm shutter to run down against a low resistance during its initial motion, and the resistance is increased in the course of the movement of the diaphragm shutter to increase the size of the aperture. The varied resistance to the movement of the diaphragm shutter is usually utilized to produce a change in the opening rate of the diaphragm shutter at preselected positions during the opening movement. Prior art escapement mechanisms, because they operate upon the diaphragm shutter substantially from the inception of its movement, seriously impair the ability of the diaphragm shutter to operate at fast shutter speeds.

SUMMARY OF THE INVENTION

Therefore, it is an object of the present invention to provide an improved diaphragm shutter.

It is another object of the present invention to provide a diaphragm shutter with improved shutter speed capability when operating during high light intensity conditions.

It is also an object of the present invention to provide improved inertial delay apparatus for use in exposure control in cameras.

In accordance with the invention, these and other objects and advantages are attained in one embodiment by a diaphragm shutter which includes diaphragm shutter blades mounted for movement to form an exposure aperture, inertial delay escapement means coupled with the blades for providing an opening sequence for the blades, and light responsive apparatus operable for closing the blades after an exposure aperture size is attained which permits the correct amount of light to pass through the exposure aperture for an exposure under existing light conditions. The blades are permitted to initially move unimpeded under a resultant opening force which is maximum during the unimpeded movement of the blades, but diminishes as the blades move to form larger aperture sizes. Therefore, high acceleration and shutter speed is attained by permitting free movement initially under high opening force and providing high resultant closing forces. Slower shutter speeds are attained by correspondingly diminishing the resultant closing force as the blades open.

In a specific embodiment of the invention the diaphragm shutter comprises first and second aperture blades mounted for movement from a position of minimum aperture toward position of maximum aperture. One of the blades is positioned to engage the escapement means after the blades move to form an aperture of preselected size. The opening-closing force is applied to the blades and to a closing element of the light responsive apparatus in a manner which permits the opening of the blades and the closing element to be under maximum force. In this manner, the opening and closing is attained when a fast shutter speed is required, but the force is selectively reduced as the aperture blades open.

It is a feature of my invention that the escapement means comprises an escapement disc and cooperating inertial means, the escapement disc having a stepped or cam surface which extends over the full range of the diaphragm shutter operation. The escapement disc is positioned so that at least one of the diaphragm shutter blades engage the stepped or cam surface during opening movement of the blades. In this manner the movement of the diaphragm shutter blades toward the maximum aperture size is impeded by varying degrees. The escapement disc may be located in spaced relation to the diaphragm shutter blades so that the diaphragm shutter blades move a finite distance before engaging the escapement disc.

DESCRIPTION OF THE DRAWINGS

Other objects and advantages of the invention will become apparent upon reading the following detailed description of the invention in conjunction with the following drawings in which.

DESCRIPTION OF THE PREFERRED EMBODIMENTS

Because photographic cameras are well known, the present description will be directed in particular to elements forming part of, or cooperating more directly with the present invention, camera elements not particularly shown or described herein being understood to be selectable from those known in the art.

Figures 1, 2:
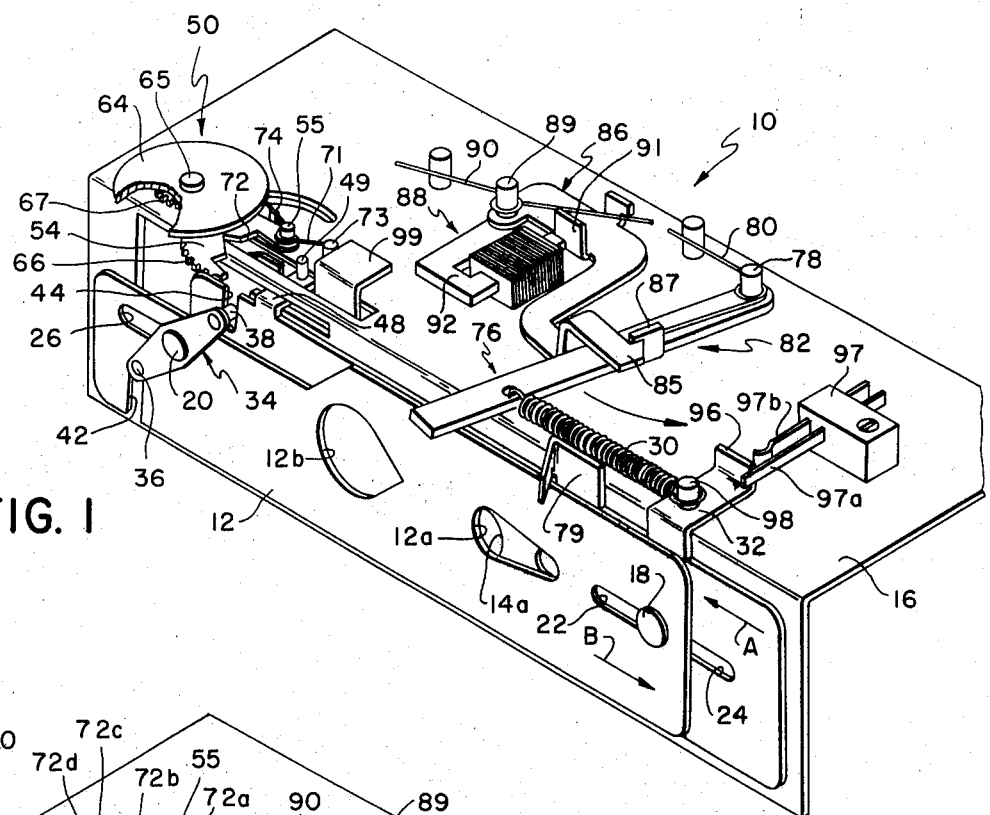
FIG. 1 is a perspective view of the diaphragm shutter according to a preferred embodiment, shown in a cocked position and showing an inertial delay escapement having discrete delay notches for providing a programmed retardation at discrete positions during the opening movement of the diaphragm shutter.
FIG. 2 is a perspective view of the diaphragm shutter of FIG. 1, shown in an open or maximum aperture position.

In describing the preferred embodiments disclosed herein, I refer first to FIG. 1 which shows diaphragm shutter apparatus 10 of the type having first and second diaphragm shutter blades 12 and 14 which are mounted for laterally opposed sliding motion on a depending section of an angle-shaped support plate 16. The blades 12, 14 are slidable on a support pin 18 and a mounting post 20 by having the pin 18 received in slots 22 and 24 of the blades 12, 14 respectively, and the post 20 received in slots 26 and 28 of the blades 12, 14 respectively. A tension spring 30, connected to a first flange 32 carried by the blade 14, urges the blade 14 in the direction of arrow A; and a transmission lever 34, which is mounted to the support plate 16 at mounting post 20, moves the blade 12 concurrent with, but in an opposed direction to the movement of the blade 14. The transmission lever 34 is pivotal about the mounting post 20 and includes projections 36, 38 which are received in slots 42, 44 located transverse to the blades 12, 14 respectively so that rotary movement of the transmission lever 34 moves the projections 36, 38 in the slots 42, 44 and thus moves the blades 12, in an opposed direction to the blade 14. The blades 12, 14 define tapered apertures 12a, 12b and 14a, 14b respectively which may be "tear drop" or "cat's eye" apertures or the like, aperture pair 12a, 14a and an aperture pair 12b, 14b being located on the blades 12, 14 in the manner to be in opposed overlapping condition as the blades 12, 14 are moved laterally. The overlapping aperture pairs thus form an aperture which will be called a photoconductor aperture 45, and exposure aperture 46, as shown in FIG. 2.

Movement of the blades 12, 14, in a prescribed manner to form the apertures 45, 46 to provide a preselected operating characteristic curve for the apparatus 10 is controlled by an inertial escapement mechanism 50, cooperating with a shutter slide pin 49 which is carried by a flange 51 formed on the blade 14. The mechanism 50 comprises an escapement disc 54 which is mounted on the upper portion of the support plate 16 at post 55, and an inertial flywheel 64 mounted at post 65 in spaced relation to the escapement disc 54. The escapement disc 54 is coupled with the inertial flywheel 64 and is inhibited in its motion thereby by means of gear teeth 66 of the escapement disc 54 coupled with a spur gear 67 that is integral with the inertial flywheel 64. An inner surface 72 of the escapement disc is irregularly shaped at 72a, 72b, 72c and 72d, (as may be seen more clearly in FIG. 2) the inner surface 72 being maintained in a predetermined position in relation to the shutter slide pin 49 by a leg spring 71. The leg spring 71 is tensioned between a post 73 of the support plate 16 and a tab 74 of the escapement disc 54 wherein it biases the escapement disc 54 to its full counterclockwise position such that movement of the blade 14 and thus movement of the shutter slide pin 49 brings the shutter slide pin 49 into engagement with the inner surface 72. The inertial flywheel 64 and irregular shapes of the inner surface 72 change the rate of opening movement of the blades 12, 14 at various positions in movement between a minimum and maximum aperture 46. The time of opening of the aperture 46 with varying rates of opening between select aperture sizes is shown in the time-aperture diagram of FIG. 5. Operation of the apparatus 10 in accordance with the characteristic curve of FIG. 5 will be more fully described later.

To move the blades 12, 14 to form a minimum aperture 46 i.e., close the apparatus 10, the tension spring 30 cooperates with a closing lever 76. The closing lever 76 is an impact member that is located on the level portion of the support plate 16 to be pivotal about a post 78 under drive from the tension spring 30, and a leg spring 80. The closing lever 76 is retained against the force of the springs 30, 80 by means of a latch 82 comprised of a catch 85 of a movable armature 86 and a tab 87 of the closing lever 76. The armature 86 is irregularly shaped and forms a movable element of an electromagnet 88. The armature 86 is pivotally mounted about a post 89 and is biased in a counterclockwise direction by a leg spring 90. The armature 86 carries a keeper 91, positioned to be adjacent to soft iron core 92 of the electromagnet 88 such that current through coils 93 of the electromagnet 88 induces a magnetic field in the core 92, and the keeper 91 is attracted thereto. Such attraction pivots the armature 86 and thus releases the catch 85 from the tab 87. The closing lever 76 is thus released and moves under the force of the springs 30, 80 to engage a detent 89 carried by the blade 14. Such engagement imparts momentum to the blade 14 to move it in an opposite direction to its opening travel; the aperture 46 is thereby closed.

The apparatus of FIG. 1 is adapted to be operable with an electronic circuit (not shown) which may include a photosensitive element or photoconductive element (not shown), a cadmium sulfide photocell or silicon photocell being two forms of such elements which would be located to receive illumination through the aperture 45. Electronic circuits of such nature typically utilize the photosensitive element in a series configuration with a fixed resistance, a junction between the photosensitive element and resistance being coupled to the input of a threshold circuit such as the well known Schmitt Trigger circuit. A voltage source such as a camera battery is switched in series circuit with the photosensitive element and fixed resistance (such as by operation of the switch 84) to provide a voltage at the input of the threshold circuit that is related to the received light intensity. The photosensitive elements generally have a resistance which varies in an inverse proportion to received light intensity. As the received light intensity varies, the resistance of the photosensitive element varies and thus the voltage at the input of the threshold circuit varies. By placing the photosensitive element behind the aperture 45, the resistance of the photosensitive element may be made to vary by varying the aperture 45, and thus a point may be reached in the movement of the blades 12, 14 at which time the threshold circuit will trigger. The electromagnet 94 may be coupled to the output of the threshold circuit and be adapted to be energized upon the triggering of the threshold circuit. The electronic circuit may also contain a capacitor which may be coupled in series circuit with the photosensitive element and voltage source and located to be coupled with the threshold circuit to energize the electromagnet 94 after a time that is related to received light intensity.

Figure 5:
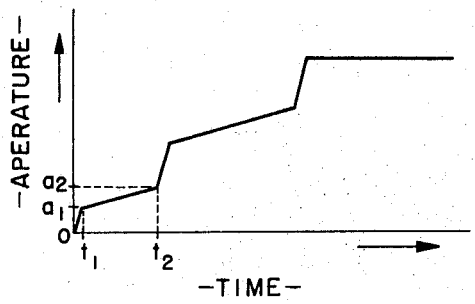
FIG. 5 is a graph of a program of exposure followed by the diaphragm shutter of FIG. 1.

To understand the operation of the apparatus reference is made to FIG. 1 in conjunction with FIG. 2. The apparatus, in the cocked position of FIG. 1, defines minimum apertures 45 and 46, which in the case of the aperture 46 is a "zero" diameter aperture and in the case of the aperture 45 may be some finite minimum size. When a camera release lever 99 is depressed, the blades 12, 14 are released, by a mechanism not shown, and under the tension of the spring 30 and the control of the transmission lever 34, move in the direction of arrows B, A respectively. As the blades 12, 14 move laterally, the apertures 45 and 46 being to increase from the minimum size. The initial travel of the blades 12, 14 is rapid and unimpeded for a finite distance, after which the shutter slide pin 49 engages the escapement disc surface 72 at 72a. At the time that the shutter slide pin 49 engages the surface 72a, the gear mesh rotates the inertial wheel 64 to provide a preselected delay of the blades in movement of the blades 12, 14 to form a larger aperture 46. As the force of the spring 30 overcomes the force of the leg spring 71, the shutter slide pin 49 moves to the surface defined as 72b and the inertial wheel 64 will again begin to produce a delay in movement of the blades 12, 14 to an increased size in the aperture 46. This procedure will be continued until a full aperture 46 is reached, as shown in FIG. 2, or the blades 12, 14 are closed by operation of the electromagnet 80. A program for such movement is shown in FIG. 5. If a full aperture is reached, as shown in FIG. 2, the electronic circuit may be switched (by means not shown) to energize the electromagnet 88 to close the aperture 46. By way of further description I refer to the diagram of FIG. 5 wherein, staring at the point zero in time and zero in aperture, the blades 12, 14 move unimpeded to the point $T_1$ in time and $A_1$ in aperture, at which point the shutter slide pin 49 engages the surface defined as 72a; and the aperture is enlarged at a different rate until the shutter slide pin 49 reaches the end of the surface 72a. The shutter slide pin 49, due to the difference in contour between the surfaces 72a, 72b, is permitted to move rapidly between the surfaces 72a, 72b resulting in a rapid change in the aperture from $A_1$ at time $T_1$ to $A_2$ at time $T_2$. This form of movement will be continued until the maximum aperture 46 is reached (in the event that light conditions are of low intensity). If received light intensity is above a preset value, a photosensitive element, being located behind the aperture 45, will reach a resistance value at some point during the movement of the blades 12, 14 such that the threshold circuit is triggered and the electromagnet 88, will become energized; the keeper 91 will thus be attracted to pole piece 92. Movement of the armature 86 is thus caused to be in a counterclockwise direction, and the latch 82 is released. Upon release of the latch 82, the closing lever 76 will move rapidly in a counterclockwise direction under the force of the springs 30, 80 into engagement with the tab 79 to move the blade 14 against the direction of arrow B, thus closing the aperture 46 and terminating the exposure. If scene illumination is very high, the electronic circuit may trigger the electromagnet 88 before the shutter pin 49 reaches the escapement disc 54. In such case the tension spring 30, being at its highest tension, will provide full force to aid the spring 80 to close the aperture 46. It is to be noted, as close study of the diagram of FIG. 5 will reveal, that the tension of the spring 30, and thus the opening and closing drive force which it imparts to the blade 14, will decrease as the aperture 46 increases.

Figure 3:
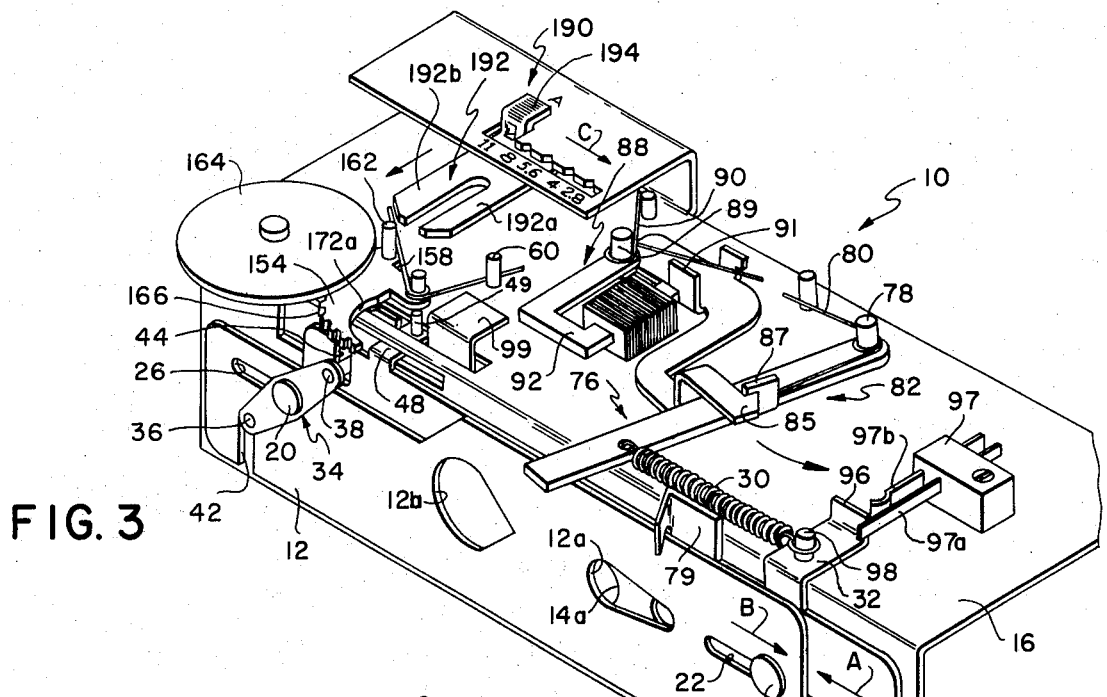
FIG. 3 is a perspective view of a second embodiment of the diaphragm shutter of FIG. 1 including a manual aperture selecting mechanism for selecting discrete aperture sizes, and showing an inertial delay escapement having continuously variable resistance.
Figure 4:
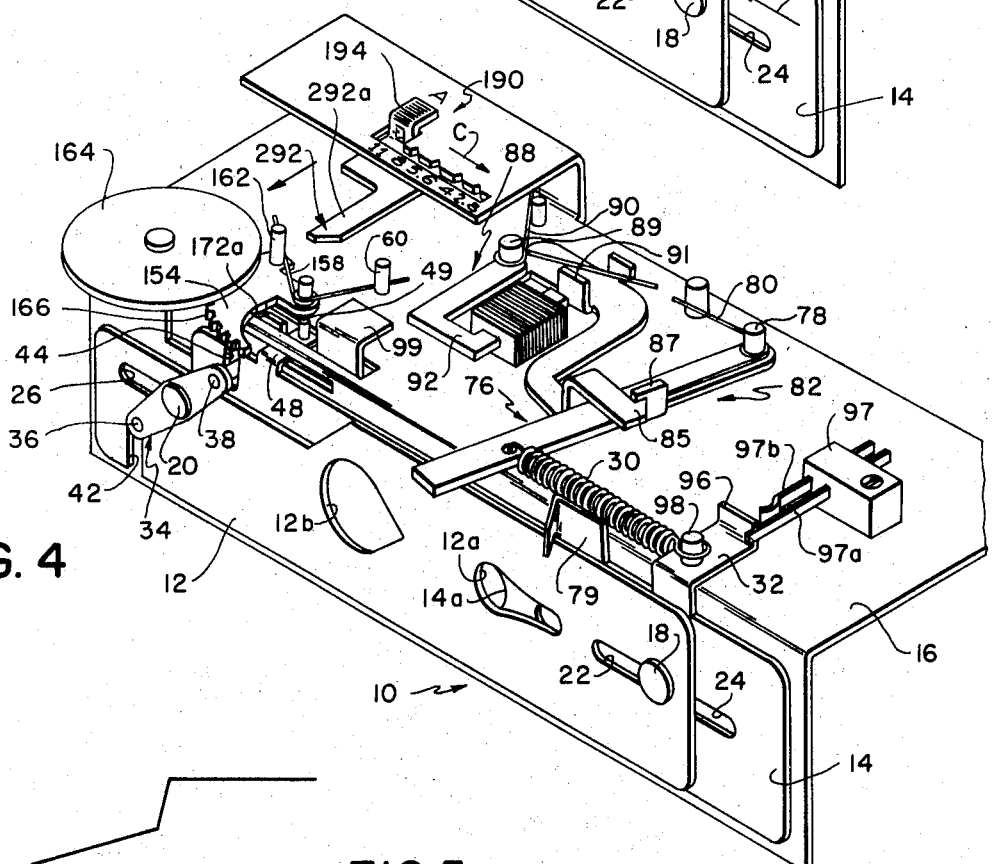
FIG. 4 is a perspective view of an alternative embodiment of the diaphragm shutter of FIG. 3 showing alternative manual diaphragm selecting apparatus.

Referring to FIGS. 3 and 4, alternative embodiments of the apparatus of FIG. 1 are shown. Since many of the elements of FIGS. 3 and 4 correspond exactly to elements of FIGS. 1 and 2, the same numerals will be given to those elements in FIGS. 3 and 4. First referring to the embodiment of FIG. 3, an escapement disc 154 is shown, which is biased in a counterclockwise direction by leg spring 158 having one leg engaging the post 73 on the support plate 16 and the other leg engaging a post 174 (rather than the tab 74) on the escapement disc 154. The escapement disc 154 includes outer surface gear teeth 166 which engage a spur gear (not shown) on an inertial wheel 164, similar to that shown in the embodiment of FIG. 1. The escapement disc 154 defines an inner surface 172 which is of a cam configuration at 172a. The operation of the apparatus of FIG. 3, in one mode of operation, is identical to that of the embodiment of FIG. 1 except that the program of FIG. 5 which corresponds to the embodiment of FIG. 1 would not be a stepped program as shown in FIG. 5; rather, the program of the embodiment of FIG. 3 would more nearly resemble a continuous curved program. The curvature of the inner surface 172; however, provides for a variable impedance to the movement of the blades 12, 14 as does the discrete surface 72 of the embodiment of FIG. 1. In addition to the curvature of the surface 172a, the embodiment of FIG. 3 includes a shutter speed adjustment mechanism 190. The mechanism includes a bifurcated slider 192, having members 192a, 192b, movable under the control of a manually manipulated finger 194, which when operated moves the bifurcated slider 192 in the direction of the escapement disc 154. As the control 194 is moved, a slot between the bifurcated members 192a, 192b of the slide 192 engages the post 162 on the escapement disc 154 to lock the escapement disc 154 in a preselected position. The control 194 may be moved in the direction of the arrow C and in doing so, the escapement disc 154 is moved which in turn moves the inner surface 172a relative to the shutter slide pin 49 so that when the blades 12, 14 are released, the shutter slide pin 49 will engage the inner surface 172 at a position which locks or sets the diaphragm aperture 46 at a fixed aperture size as labeled on the speed adjustment mechanism 190. The closing of the blades 12, 14 by de-energization of the electromagnet 94 is then accomplished through the electronic circuit which uses a photosensitive element-capacitor to energize the electromagnet 88 after a period of time which is related to the received light intensity and the size of the aperture 45.

In the embodiment of the apparatus shown in FIG. 4 the bifurcated slider 192 has been replaced by a single arm slide 292 which engages the post 162. The operation of the apparatus of FIG. 4 only differs from the operation of the apparatus of FIG. 3 in the diaphragm preselection range in that the slide 292 does not change the position of the post 162 of the escapement disc 154 when the desired stop value is set. The slide 292 is, however, provided with an abutment arm 292a against which the post 162 of the escapement disc 154 abuts during the action of the shutter to hold the blades 12, 14 in the preselected diaphragm position. In this embodiment, the blades 12, 14 perform their action unimpeded until the shutter slide pin 49 makes contact with the surface 172a whereas the blades 12, 14 are subsequently delayed during the cooperation of the shutter slide pin 49 with the surface 172a of the escapement disc 154 until the post 162 of the escapement disc 154 is caused by the clockwise rotation of the escapement disc 154 to abut against the arm 292a of the slide 292. The determination of the shutter speed as well as the functioning in the automatic range correspond to those of the mechanism described with reference to FIGS. 1 through 3. In the form of the mechanism according to FIG. 4, and its operation during high scene brightness and a large preset aperture, the blades 12, 14 do not travel up to the preset diaphragm aperture 45 but, due to the operation of the electronic circuit, close earlier in response to the illumination. As a result, the proper exposure will be made even in the case of an incorrect diaphragm preselection.

In the embodiments of FIGS. 1 through 4, the escapement discs 54, 154, instead of being provided with steps or a cam surface, may also comprise contiguous incline surfaces or a combination of steps and/or inclined surfaces. These construction means are provided for establishing a shutter speeddiaphragm aperture setting program of FIG. 5 or similar by simple inexpensive means and in accordance with the actual requirements. Moreover, as a result of the initial unimpeded movement of the shutter, high efficiency is obtained even in the case of maximum shutter speeds.

The invention has been described in detail with particular reference to preferred embodiments thereof, but it will be understood that variations and modifications can be effected within the spirit and scope of the invention.

We claim:

1. In a camera, exposure control apparatus comprising:
    diaphragm means, mounted for movement to form an exposure aperture of varied size;
    means for retaining said diaphragm means in a position to form an aperture of minimum size;
    means for urging said diaphragm means toward a position to form an aperture of maximum size;
    means for releasing said diaphragm means to permit said urging means to move said diaphragm means toward said position to form said maximum aperture;
    inertial delay means, located to be engaged by said diaphragm means after an unimpeded movement of said diaphragm means towards said position to form said maximum aperture and after an exposure aperture has been formed which would permit exposure, for retarding the opening of said diaphragm means between said minimum and maximum aperture sizes; and
    light responsive means for moving said diaphragm means to said position of minimum aperture after said diaphragm means has moved to form an aperture of a size which permits exposure in relation to the intensity of received light.

2. In a camera of the type having means for controlling an exposure aperture-time relationship in response to received light, diaphragm shutter apparatus comprising;
    first and second apertured blades, mounted for movement for forming an exposure aperture of varied size;
    means for retaining said first and second blades in a position to form a minimum of said aperture;
    means for urging said first and second blades toward a position to form a maximum of said aperture;
    means for releasing said first and second blades for movement;
    inertial delay means, including a program element to selectively retard the movement of said first and second blades during movement from said minimum aperture positions toward said maximum aperture positions and being located to be engaged by at least one of said first or second blades after a preselected unretarded movement toward said position to form said maximum aperture, for controlling the movement of said first and second blades to provide a preselected relationship between aperture and time; and
    light responsive means for moving said first and second blades to form said aperture of minimum size when said aperture has reached an aperture size which permits exposure in a predetermined relation to received light intensity.

3. Apparatus as claimed in claim 2 wherein said program element is an escapement disc having an irregularly stepped surface upon which said one blade is movable throughout the entire range of movement of said diaphragm means from a position of minimum aperture to a position of maximum aperture.

4. Apparatus as claimed in claim 2 wherein said program element is an escapement disc having an inclined surface which extends over the full range of movement of said diaphragm means.

* * * * *